United States Patent [19]
Clark, III

[11] 3,853,020
[45] Dec. 10, 1974

[54] FLEXIBLE MOTORCYCLE GEARSHIFT

[76] Inventor: Hiram Daniel Clark, III, 1129 Lakeview, Mesquite, Tex. 75149

[22] Filed: Jan. 11, 1973

[21] Appl. No.: 322,904

[52] U.S. Cl.......................... 74/560, 74/474, 74/547
[51] Int. Cl.............................................. G05g 1/14
[58] Field of Search ............ 74/560, 470, 474, 478, 74/548, 584, 547, 527, 531; 123/185 S, 185 P; 287/85, 86

[56] References Cited
UNITED STATES PATENTS

| 893,555 | 7/1908 | Sullivan | 287/86 |
|---|---|---|---|
| 1,024,139 | 4/1912 | Miller | 74/547 |
| 1,399,038 | 12/1921 | Valois | 74/548 X |
| 1,452,758 | 4/1923 | Rauch | 74/548 |
| 2,156,200 | 4/1939 | Smyers | 74/548 |
| 3,464,289 | 9/1969 | Urbach | 74/547 |

Primary Examiner—Samuel Scott
Assistant Examiner—F. D. Shoemaker
Attorney, Agent, or Firm—Howard E. Moore; Gerald G. Crutsinger

[57] ABSTRACT

A gearshift lever assembly comprising a lever secured to the shaft arranged to actuate the shifting fork in a motorcycle transmission. The lever has a universal joint secured to the inner end thereof, adapted to pivot when a force exceeding a predetermined magnitude is exerted thereon, such that the joint will be momentarily deformed relative to the shaft when the lever strikes the ground to prevent exertion of excessive force on the shaft of the transmission. A shifting arm is pivotally connected to the outer end of the lever and is maintained in an operative position by a spring adapted to permit movement of the arm upon impact.

9 Claims, 3 Drawing Figures

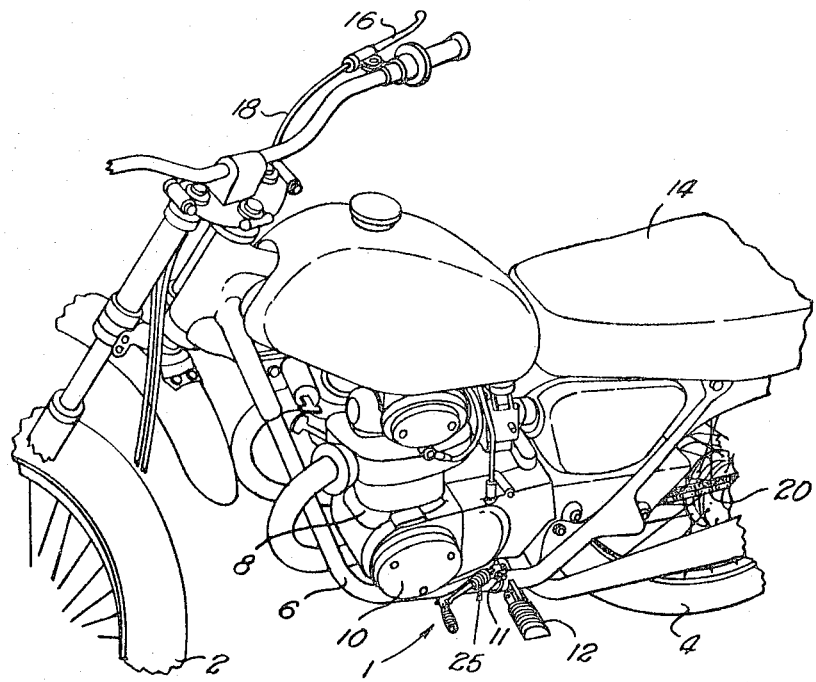
Fig. I
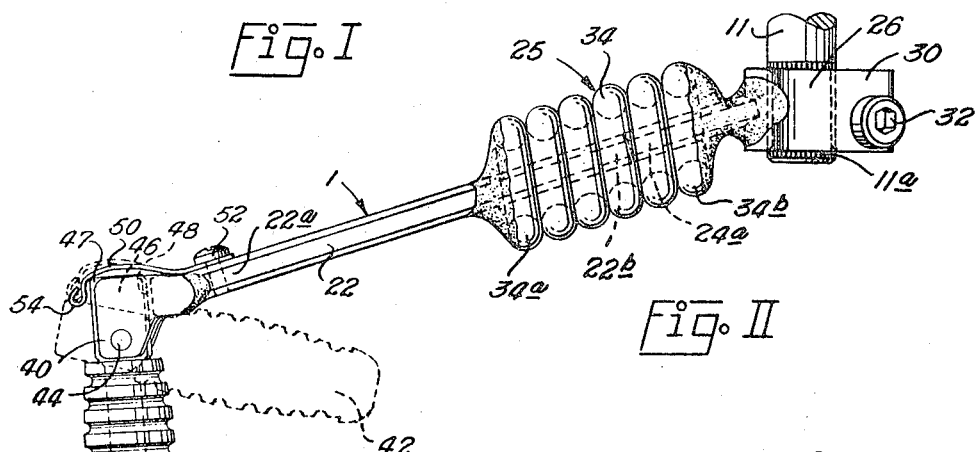
Fig. II
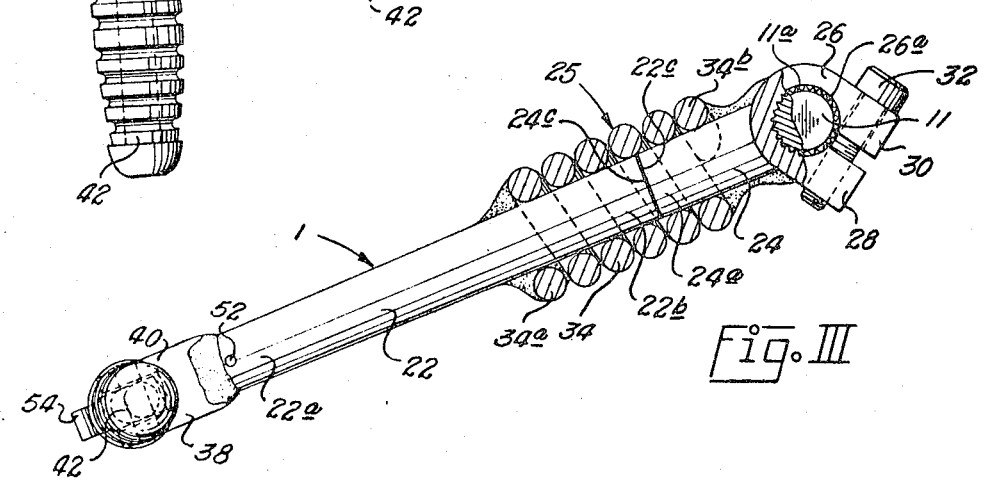
Fig. III

FLEXIBLE MOTORCYCLE GEARSHIFT

BACKGROUND OF INVENTION

The gearshift lever on a motorcycle is generally arranged for actuation by the foot of the rider. Most motorcycles are equipped with foot pegs which extend outwardly from opposite sides of the frame of the motorcycle. The gearshift lever generally has an arm on the outer end thereof positioned slightly forwardly of the foot pegs for manipulation by the toe of the rider while the foot is resting upon the foot peg.

Foot pegs are generally hingedly connected to the frame such that outer ends of each peg can be raised for moving the pegs from a substantially horizontal operative position to a substantially vertical storage position.

Fold-up type foot pegs are thus adapted for carrying downwardly directed forces but hinge upwardly when upwardly directed forces are exerted thereon.

When a motorcycle turns over the gearshift lever generally strikes the ground which often results in damage to the shifting lever, the shifting fork in the transmission and sometimes results in breaking the transmission housing.

SUMMARY OF INVENTION

I have devised a flexible gearshift lever for motorcycles which is sufficiently rigid to transmit both upwardly and downwardly directed forces for transmitting torque to the shaft of a transmission to actuate the shifting fork. However, the lever is equipped with a universal joint resiliently urged toward an operative position such that the lever is incapable of transmitting bending force or torque to parts of the transmission in sufficient magnitude to cause breakage.

The universal joint is preferably formed by cutting the shifting lever intermediate opposite ends thereof, forming first and second sections which are then joined by positioning a coil spring about ends of the respective sections and securing opposite ends of the springs to the respective sections. The joint is thus adapted to permit movement of the first section relative to the second section when excessive force or torque is applied to the first section.

The toe-piece or arm secured to the outer end of the shifting lever is pivotally mounted and retained in position by a spring such that the toe-piece will collapse upon impact.

A primary object of the invention is to provide a gearshift lever, adapted to function in conventional manner under normal operating conditions, which has sufficient resilience to prevent damage to parts of a motorcycle transmission upon impact loading of the shifting lever for example, when the lever strikes the ground.

A further object of the invention is to provide a motorcycle shifting lever having a toe-piece, normally extending substantially perpendicularly to the lever, which is adapted to piovt about a substantially vertical axis when impact loading is applied thereto.

A still further object of the invention is to provide a method of forming an elastic coupling in a motorcycle gearshift lever permitting expeditious modification of levers distributed by various manufactures.

Other and further objects of the invention will become apparent upon referring to the detailed description hereinafter following and to the drawing annexed hereto.

DESCRIPTION OF DRAWING

A drawing of a preferred embodiment of the invention is annexed hereto so that the invention may be better and more fully understood, in which:

FIG. 1 is a fragmentary perspective view of a motorcycle, illustrating the relationship of the gearshift lever to other components of the motorcycle;

FIG. II is a plan view of the gearshift lever connected to the shaft of a motorcycle transmission; and FIG. III is a partially sectionalized elevational view of the gearshift lever illustrated in FIG. II.

Numeral references are employed to designate like parts throughout the various figures of the drawing.

DESCRIPTION OF A PREFERRED EMBODIMENT

Referring to FIG. I of the drawing, the numeral 1 generally designates the improved gearshift lever mounted upon a conventional motorcycle.

The particular motorcycle diagramatically illustrated in FIG. I simulates a 1972 "Honda-350." However, it should be appreciated that the gearshift lever is similarly situated on most other makes and models of motorcycles.

The motorcycle comprises front and rear wheels 2 and 4, respectively, mounted on a frame 6 carrying an engine 8 and transmission 10.

Foot pegs 12 are hingedly connected to opposite sides of frame 6 for supporting feet of a rider sitting upon seat 14.

Before shifting gears, the rider manipulates the handle bar control 16 connected through a flexible cable 18 to the transmission 10 for disengaging the clutch. Disengaging the clutch disconnects the drive shaft of the engine from a driven shaft which is connected through a drive system including sprockets and chain 20 for rotating the rear wheel 4 of the motorcycle.

After the clutch has been disengaged, the rider shifts gears by rotating lever 1 upwardly or downwardly with his toe.

Referring to FIGS. II and III of the drawing, gearshift lever 1 comprises members 22 and 24 joined by an elastic coupling 25 adapted for universal movement.

Member 24 has an internally splined split sleeve 26 secured to the end thereof arranged to grippingly engage shaft 11 of a motorcycle transmission. Shaft 11 preferably has splines 11a on the outer surface thereof for engagement with splines 26a formed on the inner surface of sleeve 26. Ears 28 and 30 extend outwardly from split sleeve 26 and have apertures formed therein through which threaded screw 32 extends for clamping sleeve 26 on the end of shaft 11.

It should be appreciated that fastening means other than split sleeve 26 may be employed for securing member 24 to shaft 11. For example, pins, keys or set screws may be employed.

The inner end 22b of member 22 is connected in abutting relation with the outer end 24a of member 24 by a spring 34 having opposite ends 34a and 34b welded or otherwise secured to members 22 and 24, respectively, in spaced apart relation from the ends 22b and 24a thereof. Spring 34 is preferably a coil spring having ends 22b and 24a extending thereinto such that the spring will be stretched when force is exerted upon member 22 tending to pivot member 22 about an edge thereof relative to the end 24a of member 24.

Since the end surfaces 22c and 24c on members 22 and 24 are positioned in abutting relation, in the preferred embodiment of the invention illustrated in FIG. III, force of substantial magnitude is required to separate surfaces 22c and 24c. The magnitude required to separate the surfaces is controllable by selecting a spring 34 having a spring constant to provide the desired degree of stiffness. Thus the elastic joint 25 can be constructed to prevent relative movement of surfaces 22c and 24c until force having sufficient magnitude to damage the transmission of the motorcycle is exerted upon member 22.

The outer end 22a of member 22 has ears 38 and 40 formed thereon to which an arm 42 is pivotally connected by a pin 44.

Arm 42 has a substantially rectangular lug 46 thereon arranged to engage shoulder 48 between ears 38 and 40 preventing rotation of arm 42 in a clockwise direction as viewed in FIG. II.

A leaf-type spring 50 has one end secured adjacent the outer end 22a of member 22 by a screw 52 and has a hook 54 on the other end thereof engageable with lug 46 adjacent corner 47 thereof.

When force is applied tending to rotate arm 42 about pin 44, to the position illustrated in dashed outlines, the hook portion 54 of spring 50 exerts force adjacent corner 47 on lug 46 to resiliently resist rotation.

The particular configuration of spring 50 having a hook 54 on the outer end thereof provides a relatively stiff joint at the pivotal connection between arm 42 and member 52 so as to not interfere with normal operation of the shifting lever. However, when excessive force is exerted upon arm 42, arm 42 can snap suddenly to the position illustrated in dashed outline. Arm 42 can be returned to position illustrated in full outlines by applying minimal force.

From the foregoing it should be readily apparent that the improved gearshift lever herinbefore described provides a relatively rigid construction having the feel of a conventional rigid gearshift lever under normal operating conditions. However, when the motorcycle is dropped to the ground, force exerted upon arm 42 and member 22 will not be transmitted to shaft 11 of the motorcycle transmission.

It should be readily apparent that other and further embodiments of the invention may be devised without departing from the basic concept thereof.

Having described my invention, I claim:

1. A motorcycle gearshift lever adapted to rotate a shaft comprising: a first member having an inner end and an outer end; connector means to secure the inner end of said first member to the shaft; means to prevent rotation of said connector means relative to said shaft; a second member having an inner end and an outer end; an elastic coupling extending about the outer end of the first member and about the inner end of the second member; means to secure one end of said elastic coupling to the first member; means to secure the other end of the elastic coupling to the second member; an arm; and means to secure the arm to the other end of the second member.

2. The combination called for in claim 1 wherein the elastic coupling comprises: a coil spring.

3. The combination called for in claim 1 wherein the means to connect the arm to the outer end of the second member comprises: means pivotally connecting said arm to the outer end of said second member; and resilient means secured to the second member engageable with said arm to prevent pivotal movement of the arm relative to the second member until force exceeding a predetermined magnitude is exerted upon the arm.

4. The combination called for in claim 3 wherein the resilient means comprises: a leaf spring having a first end secured to said second member; and a hook on the outer end of the spring arranged to engage said arm.

5. The combination called for in claim 1 wherein the means to secure the arm to the outer end of the second member comprises spaced ears on the outer end of the second member; a shoulder on the outer end of said second member positioned between said spaced ears; a lug on said arm, said lug being positioned between said spaced ears; means to pivotally secure said lug to said spaced ears; a spring having a first end secured to the outer end of said second member; a hook on said spring engageable with said lug resiliently urging said lug into engagement with said shoulder.

6. The combination called for in claim 1 wherein said connector means comprises: a split sleeve having lugs secured thereto, each of said lugs having apertures formed therein; and means positioned in the apertures adapted to urge the sleeve into gripping relation with said shaft.

7. A motorcycle gearshift lever adapted to rotate a shaft comprising: a lever; means securing one end of said lever to the shaft; spaced ears on the other end of said lever; a shoulder on the end of said lever between the said spaced ears; an arm; a lug on an end of said arm; means pivotally securing said lug between said spaced ears; a leaf-type spring; means securing one end of said leaf-type spring to said lever; a hook on said leaf-type spring, said hook being positioned to resiliently urge said lug into engagement with said shoulder.

8. Apparatus to rotate a shaft comprising: first and second lever members positioned in end-to-end relation; an elastic coupling secured to said first and second members resiliently urging said first and second members into axial alignment; means securing one end of said first lever member to the shaft; spaced ears on the end of said second lever member; a shoulder on the end of said second lever member between said spaced ears; an arm; a lug on an end of said arm; means to pivotally secure said lug between said spaced ears; a leaf-type spring; means to secure one end of said leaf-type spring to said second lever member; a hook on said leaf-type spring, said hook being positioned to resiliently urge said lug into engagement with said shoulder.

9. The combination called for in claim 8 wherein the elastic coupling comprises a coil spring positioned about ends of the first and second members; means to secure a first end of said coil spring to the first member; and means to secure a second end of said coil spring to the second member.

* * * * *